April 19, 1955     I. W. LOVELADY ET AL     2,706,531
GAS AND MULTIPLE LIQUID SEPARATOR APPARATUS
Filed Oct. 30, 1951     3 Sheets-Sheet 3
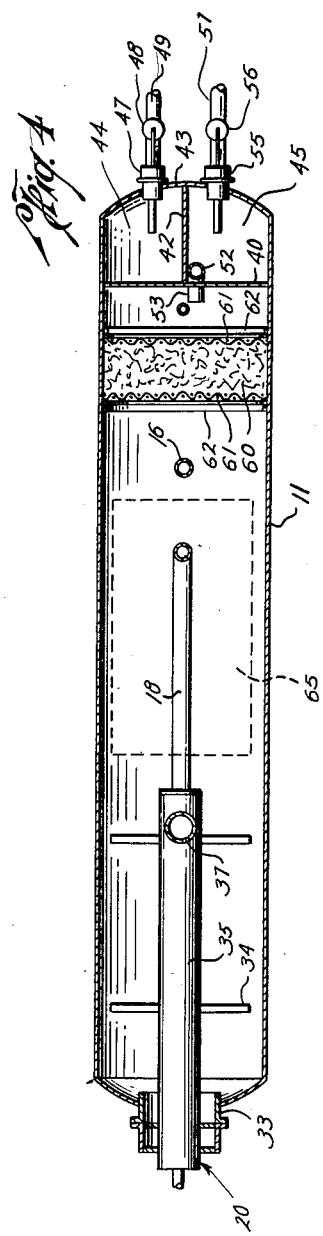
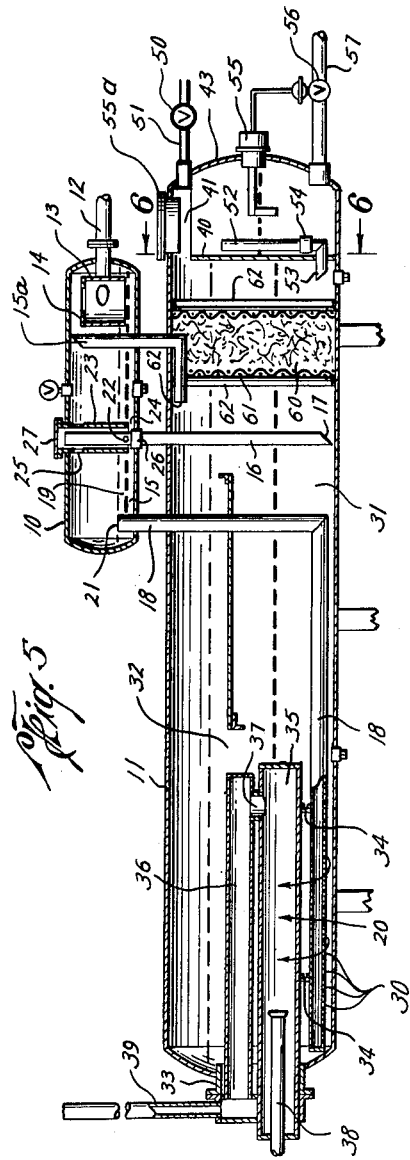
Sanford P. Kroeker
Isaac W. Lovelady
INVENTORS
BY
ATTORNEYS

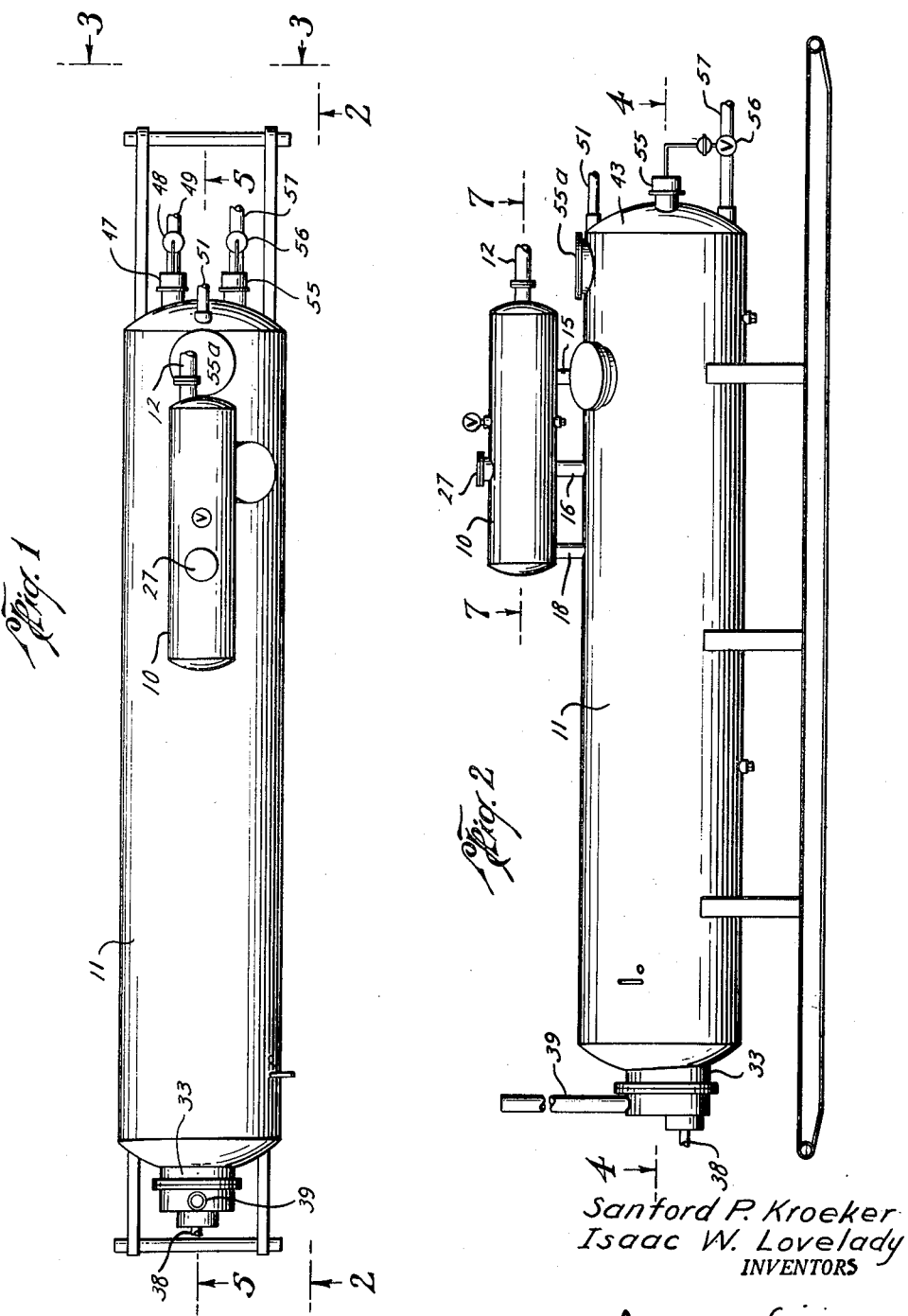

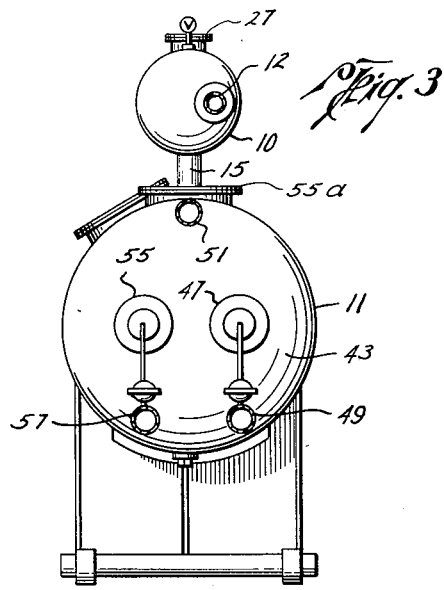
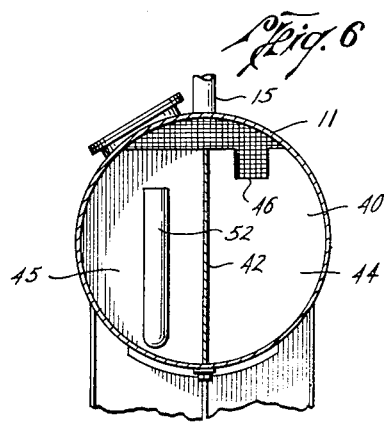
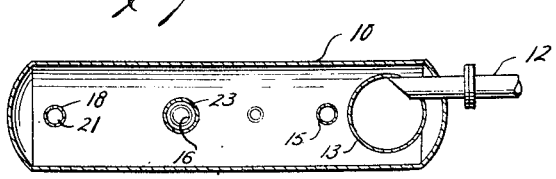

United States Patent Office 2,706,531
Patented Apr. 19, 1955

2,706,531

GAS AND MULTIPLE LIQUID SEPARATOR APPARATUS

Isaac W. Lovelady and Sanford P. Kroeker, Odessa, Tex., assignors to Sivalls Tanks, Inc., Odessa, Tex., a corporation of Delaware Application October 30, 1951, Serial No. 253,914

11 Claims. (Cl. 183—2.7)

This invention relates to improvements in separator apparatus and refers more particularly to the separation of a mixture of gas and two or more liquids having limited miscibility with each other. The apparatus of this invention is especially adapted for the separation of mixtures of petroleum gas and oil produced from oil and gas wells in admixture with or in an emulsion with water wherein the treatment requires heating for most efficient separation; the apparatus also being adapted for the treatment of similar mixtures which may occur in the course of refining hydrocarbon materials.

Many oil and gas wells produce fluids which are a mixture of petroleum gas and crude oil in the form of an emulsion with water, particularly salt water. The water may be bound up with the oil to form that which is known as a "tight" emulsion which is hard to break so as to permit separation between the oil and water. Also, in many instances, the well fluids include portions which may be termed "free water" and these portions are relatively easy to separate from the remainder of the fluids by simple settling procedures. It is generally desirable to separate the gas, oil and water components at or near the location of the production after which the components can be disposed of separately in accordance with conventional practices. It is, therefore, an object of this invention to provide separator apparatus which is rugged, economical and simple to manufacture and operate, and which will separate gas and a plurality of relatively immiscible liquids into a comparatively "dry" gas and a plurality of fractions of liquids of different specific gravity.

Another object of this invention is to provide separator apparatus particularly adapted to be used to treat well fluids comprising water which is relatively easy to separate as well as an emulsion requiring heating for efficacious separation of its components.

Another object of this invention is to provide separator apparatus wherein a heater is employed to heat an emulsion portion of a well fluid in combination with apparatus for separating easily separable water from the well fluids prior to the heating of said emulsion portion so that the load on the heater can be maintained at a minimum.

Another object of this invention is to provide in a separator apparatus, a heater in combination with a liquid feeding means so arranged in a vessel or tank that the liquid from the heating means is distributed evenly along the heater and rises therearound while being heated after which it flows away from the heater in a horizontal direction to separate into phases, the general direction of travel of the components of each phase being parallel to the interface between the phases so that such horizontal travel does not interfere with vertical settling occurring in either phase.

Another object of this invention is to provide in a separator apparatus the combination of a tank having a heater therein for heating an emulsion and further having a baffle disposed adjacent the heater for creating a thermosiphon effect in the tank whereby emulsion can be recirculated in the tank for further treatment while concomitantly selectively withdrawing separated phases from the locale of the heater in said tank.

Another object of this invention is to provide a gas and multiple liquid separator apparatus wherein a centrifugal separator is provide to effect an initial separation between the gaseous and liquid components of a mixture, a preliminary settling tank is provided for separation of relatively easily separable water from an emulsion containing the same, and wherein means are provided for heating the thus separated emulsion in a second tank, the second tank also including a quiescent zone for separation of the heated emulsion into phases by a vertical settling action while the phases are traveling generally horizontally, and wherein the interface level between the phases is maintained intermediate the vertical extremities of the heater so as to provide a more efficacious treatment of the emulsion.

Other objects, advantages and features of this invention will became apparent to one skilled in the art upon a consideration of the written disclosure, the appended claims and the attached drawings wherein:

Fig. 1 is a plan view of a preferred embodiment of the separator apparatus embodying this invention;

Fig. 2 is an elevational view of the apparatus taken on the line 2—2 of Fig. 1;

Fig. 3 is an end view of the apparatus taken on the line 3—3 of Fig. 1;

Fig. 4 is a cross-sectional view taken on the line 4—4 of Fig. 2;

Fig. 5 is a view taken on the line 5—5 of Fig. 1;

Fig. 6 is a cross-sectional view taken on the line 6—6 of Fig. 5; and

Fig. 7 is a cross-sectional view taken on the line 7—7 of Fig. 2.

Like characters of reference will be used throughout the several views to designate like parts.

Referring to the drawings, the numerals 10 and 11 indicate vessels or tanks which are preferably mounted with their greatest dimension disposed in a horizontal direction, and with the bottom of tank 10 above the bottom of tank 11. In its preferred form, tank 10 is mounted above tank 11 and can be supported thereby. These tanks are preferably of circular cross-section and substantially cylindrical in formation, but it will be appreciated that they may be made of another shape if so desired.

Adjacent one end or extremity of tank 10 is an inlet conduit 12 through which the mixture to be treated, generally water, petroleum oil and gas and including an oil-water emulsion, enters the treating apparatus. This inlet conduit after passing through the wall of tank 10 is in communication substantially in a tangential direction with and empties into the interior of a separator shell 13 disposed within tank 10 adjacent the point where the inlet conduit 12 enters tank 10. This separator shell is substantially circular in horizontal cross-section and is illustrated as being cylindrical, although in desired cases, shapes other than true cylindrical shapes might be employed. Preferably, the length of the centrifugal separator cylinder 13 is such that its upper end extends above a liquid level to be maintained in tank 10 and its lower end is submerged in the liquid in the tank sufficiently to prevent gas from passing thereunder. In a preferred form, the separator cylinder is provided with an inturned, annular flange 14 adapted to prevent, insofar as possible, the flow of any liquids from the upper end of the separator shell and thereby prevents undue entrainment of liquid droplets in the gas flowing from the upper end of the separator.

A gas transfer conduit or pipe 15a is provided between tanks 10 and 11 and has an inlet in the upper portion of tank 10 and a discharge in the upper portion of tank 11 so that gas separated from incoming liquids by centrifugal separator 13 can pass from tank 10 into tank 11.

In many types of liquid mixtures to be treated in this apparatus, there will be contained a component immiscible with another component of the mixture and relatively easily separable therefrom by settling. When treating oil-water, emulsions, for example, a part of the water in such emulsion may be easily separable and, in accordance with this invention, this easily separable portion of water is settled into a separate phase in tank 10. While tank 10 may be relatively small compared to tank 11, it will contain enough volume to provide sufficient settling time therein for the liquid phases to settle this "free water" or relatively easily separable water into a separate phase indicated by the numeral 15. In a preferred embodiment, this water is removed from tank 10 and passed into tank 11 to join the water phase situated therein and is not heated as is the emulsion from which it has separated. Means are provided for effecting this removal comprising a liquid transfer conduit 16 extending between the two tanks and having a discharge end 17 at the lowermost portion of tank 11. In this manner, the load on the heating apparatus of tank 11 is maintained at a minimum.

Another liquid transfer conduit means comprising a conduit 18 is provided between tanks 10 and 11, and is adapted to transfer a lighter liquid phase, such as the emulsion phase 19 lying above water phase 15, to tank 11 at a point beneath heater 20. To cause the proper phase to flow into the proper liquid transfer conduit, there is provided means for maintaining lighter and heavier liquid levels in tank 10 such that the heavier liquid flows into conduit 16 and the lighter liquid flows into conduit 18. These means can be provided by inlet opening 21 in conduit 18 and an inlet opening 22 into conduit 16. A weir is provided around the upper end of conduit 16 in tank 10 to prevent the lighter phase 19 from flowing into the conduit. Such weir can comprise a conduit 23 carried by tank 10 and having openings 24 in the bottom thereof to permit heavier liquid phase 15 to flow thereinto and thence into opening 22. Openings 25 can be provided in the upper end of conduit 23 to provide communication between the gas space in tank 10 and the interior of the conduit so as to equalize the pressure therein with the gas pressure externally thereof. The elevational relationship between opening 21, opening 22, and the uppermost portion of opening 24 in conduit 23 are so arranged that the interface level between phases 15 and 19 is maintained above opening 24 so that phase 19 will flow only into conduit 18 and phase 15 will flow only into conduit 16. Generally, the lowermost portion of opening 22 will be intermediate in level between the uppermost portion of opening 24 into conduit 23 and flow opening 21 into conduit 18. Of course, the exact dimensions and dispositions of these flow openings will be determined by the various gravities of the liquid phases and to provide adjustment to compensate for variations in these, a coupling 26 is provided in conduit 16 near the lower portion of tank 10 so that the section of conduit 16 thereabove can be removably screwed into the coupling. A plurality of such upper conduit sections can be made up with openings 22 at various distances from the ends thereof to provide for readily adjusting the interface level between phases 15 and 19 in tank 10. A manhole 27 can be provided to facilitate this interchange of conduit sections. The inlet end 21 of conduit 18 is situated intermediate the ends of separator shell 13 so that a liquid level will always be maintained in tank 10 above the lower end of the separator, thereby providing a liquid seal for the bottom of the separator to prevent gas from escaping under its lower end as pointed out above.

Conduit 18 extends, as stated above, to underlie heater 20, and the underlying portion is provided with a plurality of discharge openings 30 therein, preferably on the underside of the conduit, so that emulsion flowing from tank 10 can pass through these openings and thence up around the heater. By placing the discharge openings on the underside of conduit 18, the emulsion flowing through pipe 18 tends to fill the same before any emerges through the openings, thereby assuring an even distribution of the emulsion along the length of the heater. The reason for this is that the underlying portion of conduit 18 is surrounded by a water phase 31 of a higher gravity than the emulsion within the conduit so that the water phase tends to enter the openings but is prevented from doing so by the hydrostatic head of emulsion in conduit 18. Nevertheless, the water phase acts to oppose flow of emulsion from the openings and this opposition is uniform along the length of conduit 18 so that the rate of discharge of emulsion from the openings 30 is automatically regulated to be uniform along the length of the heater.

Heater 20 is disposed in tank 11, preferably at one end thereof, in such a manner that the interface between water phase 31 and oil phase 32 lies between the upper and lower extremities of the heater. The purpose of the heater is to heat emulsion discharged from conduit 18 which heating will cause the emulsion to resolve into its respective phases. As illustrated in the drawings, heater 20 is inserted into tank 11 through flanged conduit 33 and rests upon cross-support members 34. The heater includes a fire tube 35 and a flue tube 36 substantially parallel to each other and connected by a short length of conduit 37. A burner 38 which may be of a conventional type, is inserted into the fire tube 35 and may be fed with a combustible mixture of natural gas or other fuel and air, or the fuel may be injected through the burner and air drawn into the fire tube through suitable openings at its outward end. Flue gases leave tube 36 through stack 39. Thus, there is provided an elongate, U-shaped burner overlying emulsion or lighter liquid transfer conduit 18 in such a manner that liquid discharged from the conduit will contact the heating surfaces of the heater, become heated, and rise due to a decrease in its gravity.

Disposed at a position remote from burner 20 and preferably at the end of tank 11 opposite from the burner is a means for maintaining a predetermined lighter liquid level above heater 20 in tank 11 and a predetermined lighter and heavier liquid interface level intermediate the upper and lower extremities of the heater. Such means can include a weir plate 40 extending across the cross-section of tank 11 except for a top cutaway portion 41 which provides an opening for gaseous communication between both sides of the plate to equalize pressures thereacross. A partition plate 42 is provided between plate 40 and the end 43 of tank 11 to divide the end of the tank into two compartments 44 and 45. Compartment 44 serves as an accumulator for the lighter liquid which flows thereinto over a weir opening 46 whose lower portion or lip is positioned to maintain a substantially constant level of the lighter liquid phase 32 above heater 20. This lighter liquid is maintained in compartment 44 at a level lower than its level in the main portion of tank 11 by a conventional liquid level control 47 actuating a valve 48 in the lighter liquid outlet conduit 49. With such arrangement, the lighter liquid level in the main portion of tank 11, that is, the interface between the gas phase and liquid phase 32 in tank 11, is maintained substantially constant in the main portion of the tank irrespective of flow into or out of such main portion and yet sufficient gas pressure can be maintained upon the lighter liquid in compartment 44 to force it out through conduit 49 to a subsequent processing step, if desired. Such gas pressure can be maintained by a back pressure regulating valve 50 situated in the gas outlet conduit 51.

Compartment 45 is employed to accumulate separated heavier liquid, in many instances water, which flows thereinto through an overflow conduit 52, having a communication with the main portion of the tank through plate 40 by means of an L 53. The heavier liquid from phase 31 flows through L 53 and upwardly through conduit 52 to overflow into the compartment to a liquid level maintained therein at a lower point. The length of conduit 52 can be suitably varied to provide the desired level of the interface between phases 31 and 32 in the main portion of tank 11, taking into consideration the individual depth of the two phases and their difference in gravity. The outlet end of conduit 52 will always be vertically situated between the interface level between phases 31 and 32 and the upper liquid level of the upper phase 32. Conduit 52 has a screw connection with coupling 54 so that it can be readily removed through manway 55a and replaced with conduits of other lengths to provide ready adjustability of the interface level in the main tank. As in compartment 44, there is provided a conventional liquid level control 55 controlling a valve 56 situated in the heavy liquid outlet conduit 57.

In accordance with one aspect of this invention, there can be situated between heater 20 and plate 40 of the liquid level maintaining means a filter 60 comprising suitable packing material having an extended surface, such as ordinary wood excelsior. The packing extends across the entire cross-sectional area of tank 11 and is held in place by suitable perforate members 61, such as heavy screen, expanded metal mesh, or similar. Such perforate members are attached to circular supports 62 which may be of angle iron extending around the inner periphery of tank 11. It will be noted that gas transfer conduit 15 has its outlet on the side of filter 6 most removed from gas outlet conduit 51, so that gas flowing from tank 10 must pass through the filter before flowing from tank 11. This assists in removing any entrained liquid from the gas.

It is to be noted that heater 20 and plate 40 of the liquid level maintaining means are remote from each other, thereby providing a portion of tank 11 therebetween which forms a relatively quiescent zone permitting settling of liquids flowing horizontally therethrough into phases 31 and 32. Liquid flow through this quiescent zone is generally horizontal, as distinguished from vertical, and such horizontal flow does not substantially interfere with or hinder the downward or upward velocity of droplets of one phase tending to pass into the other phase. Thus, for example, if a drop of water agglomerates in phase 32 (oil phase) it will settle downwardly towards water phase 31 at a rate substantially that which it would attain were the two phases entirely quiescent.

As a feature of this invention there is disposed in tank 11 a horizontal baffle 65 extending laterally across the tank and preferably from one side to the other and also extending longitudinally from a point adjacent heater 20 to a point more remote therefrom. This baffle is situated in the lighter liquid phase 32, and in some manner helps to resolve the emulsion into separate phases. It is believed that as the liquid which is heated by heater 20 rises toward the surface of phase 32, it will flow toward the outlet of tank 11 along the surface of such phase and over the top of baffle 65. While so flowing, any unresolved emulsion, being heavier than the lighter liquid, will tend to settle out on top of the baffle and upon reaching the end thereof, will flow downwardly towards the interface between the lighter and heavier liquids. It will not, however, substantially enter the heavier liquid phase because the emulsion is lighter than such liquid phase. Now since there is a space between the end of the baffle nearest heater 20 and the adjacent end of the heater, it is apparent that liquid heated by the heater in this space will tend to rise through the space and thereby create a thermo-siphoning effect or flow of liquid around baffle 65 to draw emulsion or other liquid toward the heater under the baffle. The amount of heat introduced by heater 20 into the liquid can be regulated to determine the amount of siphoning occurring and, hence, can determine the number of times the unresolved emulsion or lighter liquid will pass around baffle 65. It will be noted that the lighter liquid which has separated from the emulsion will tend to flow towards filter 60 and the discharge end of the treating apparatus. Any heavier liquid separated from the emulsion will likewise settle into phase 31 and likewise flow from the apparatus. It will be apparent that by regulating the volume of liquid recirculated by the thermo-siphoning baffle 65 to be such that the unresolved emulsion is recirculated until it is broken down into separable phases and by regulating the rate at which the emulsion is fed through conduit 18, substantially all the emulsion can be resolved while concomitantly withdrawing separated phases from the apparatus.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

We claim:

1. A gas and multiple liquid separator comprising, tank means including a first horizontally extending chamber for initially separating a heavier liquid and gas from a lighter liquid of a gas and multiple liquid mixture, a centrifugal separator cylinder mounted upright within said first chamber, conduit means connecting the exterior of said tank means with the interior of said cylinder for introducing said gas and multiple liquid mixture into the cylinder substantially tangentially thereof, a heater in a second horizontally extending chamber of said tank means and separated from the first chamber, means including liquid outlets in a third chamber of said tank means for maintaining in said second chamber a predetermined lighter liquid level above the heater and a predetermined lighter and heavier liquid interface level, a quiescent zone in said second chamber between said heater and said third chamber providing substantially unrestricted horizontal flow from said heater, a first conduit communicating between the first and second chambers providing for the transfer of gas between the upper portion of said first chamber and the upper portion of said second chamber, a gas outlet for withdrawing gas from the upper portion of said second and third chambers of the tank means, a second conduit communicating between the first and second chambers providing for transfer of the initially separated lighter liquid from said first chamber into said second chamber, means for directing said initially separated lighter liquid from said second conduit to a location below the heater, and a third conduit connecting the lower portion of said first chamber with the lower portion of said quiescent zone for conducting said initially separated heavier liquid from said first chamber to said quiescent zone in by-passed relation to said heater.

2. A gas and multiple liquid separator of the character defined in claim 1, including a filter extending vertically across the second chamber of the tank means.

3. A gas and multiple liquid separator of the character defined in claim 2, in which the filter extends vertically from the upper portion of said second chamber of the tank means to at least the lighter and heavier liquid interface level thereof.

4. A gas and multiple liquid separator of the character defined in claim 2, in which the filter is located intermediate the gas outlet and the quiescent zone.

5. A gas and multiple liquid separator which comprises, in combination, first and second elongate tanks mountable with their greatest dimension extending horizontally and with the first tank above the second tank, a centrifugal separator cylinder mounted upright within the first tank, a gas and multiple liquid inlet conduit having a substantially tangential connection to said cylinder, a gas transfer conduit between the upper portions of said first and second tanks, a heater within said second tank, a first liquid transfer conduit means between said first and second tanks and having a discharge into the lowermost portion of said second tank remote from said heater, a second transfer conduit means having an inlet in said first tank above the lower end of said cylinder and having a discharge opening in said second tank underlying a substantial portion of said heater, means in said first tank for maintaining a predetermined lighter and heavier liquid interface level below said inlet to said second conduit means and providing for flow of heavier liquid into said first conduit means, a gas outlet from said second tank and means including liquid outlets for maintaining in said second tank a predetermined lighter liquid level above said heater and a predetermined lighter and heavier liquid interface level intermediate the upper and lower extremities of said heater, said liquid level maintaining means being remote from said heater to provide a quiescent zone therebetween for separation of said lighter and heavier liquids into phases.

6. The apparatus of claim 5 wherein said heater is at one end of said second tank and the liquid level maintaining means is at the other end and the discharge outlet from said first transfer conduit means is intermediate the heater and liquid level maintaining means.

7. The apparatus of claim 6 in combination with a filter extending vertically across the entire cross-section of said second tank and situated between said heater and said liquid level maintaining means.

8. The apparatus of claim 7 in combination with a substantially horizontal baffle extending laterally across said second tank and having a substantial portion thereof situated intermediate said heater and said liquid level maintaining means at a level below the lighter liquid level but above the lighter and heavier liquid interface level.

9. The apparatus of claim 8 wherein the discharge outlets into said second tank of said gas transfer conduit and said first conduit means are both on the side of said filter most removed from said liquid level maintaining means.

10. A gas and liquid multiple separator which comprises, in combination, first and second elongate tanks mountable with their greatest dimension extending horizontally and with the first tank above the second tank, a centrifugal separator cylinder mounted upright within the first tank adjacent one extremity thereof, a gas and multiple liquid inlet conduit having a substantially tangential connection to said cylinder, a gas transfer conduit between the upper portions of said first and second tanks, an elongate heater within said second tank and adjacent one extremity thereof, a first liquid transfer conduit between said first and second tanks and having an inlet in said first tank and a discharge into the lowermost portion and intermediate the ends of said second tank so as to be remote from said heater, a second transfer conduit having an inlet above the lower end of said cylinder and having a portion of its length underlying said heater, said underlying portion having discharge openings therein to distribute liquid along a substantial portion of the length of said heater, a weir around the inlet to said first conduit having a flow opening at a level below the flow opening of said second conduit, the lowermost portion of said inlet to said first conduit being intermediate the uppermost portion of said flow opening in said weir and below the opening into said second conduit, a gas outlet from siad second tank, means including liquid outlets for maintaining in said second tank a predetermined lighter liquid level above said heater and a predetermined lighter and heavier liquid interface level intermediate the upper and lower extremities of said heater, said liquid level maintaining means being remote from said heater to provide a quiescent zone therebetween for separation of said lighter and heavier liquids into phases and a substantially horizontal baffle extending laterally across said second tank and extending longitudinally from a point spaced adjacently from said heater to a point more remote therefrom, said baffle being vertically situated on a level between said lighter liquid level and said lighter-heavier interface level.

11. The apparatus of claim 10 in combination with a filter extending vertically across said second tank and situated between said liquid level maintaining means and the outlets from said gas transfer conduit and said first conduit.

References Cited in the file of this patent
UNITED STATES PATENTS

| | | |
|---|---|---|
| 2,179,131 | Millard | Nov. 7, 1939 |
| 2,457,959 | Walker | Jan. 4, 1949 |
| 2,586,221 | Glasgow | Feb. 19, 1952 |
| 2,601,903 | Erwin | July 1, 1952 |
| 2,601,904 | Erwin | July 1, 1952 |
| 2,685,938 | Walker et al. | Aug. 10, 1954 |